(12) United States Patent
Marce

(10) Patent No.: US 7,170,899 B2
(45) Date of Patent: Jan. 30, 2007

(54) METHOD OF SETTING UP A CALL WITH A PREDETERMINED SET OF REQUIRED SERVICE AND/OR CHARACTERISTICS, AND A CORRESPONDING NETWORK

(75) Inventor: Olivier Marce, Massy (FR)

(73) Assignee: Alcatel, Paris (FR)

( * ) Notice: Subject to any disclaimer, the term of this patent is extended or adjusted under 35 U.S.C. 154(b) by 919 days.

(21) Appl. No.: 10/089,168

(22) PCT Filed: Jul. 26, 2001

(86) PCT No.: PCT/FR01/02452

§ 371 (c)(1),
(2), (4) Date: Mar. 27, 2002

(65) Prior Publication Data

US 2002/0150111 A1 Oct. 17, 2002

(30) Foreign Application Priority Data

Jul. 31, 2000 (FR) .................................. 00 01087

(51) Int. Cl.
*H04L 12/28* (2006.01)
(52) U.S. Cl. ........................ 370/410; 370/466; 370/522
(58) Field of Classification Search ................ 370/410, 370/466, 522
See application file for complete search history.

(56) References Cited

U.S. PATENT DOCUMENTS

| | | | |
|---|---|---|---|
| 5,504,837 A | 4/1996 | Griffeth et al. | |
| 5,802,058 A * | 9/1998 | Harris et al. | 370/410 |
| 5,867,498 A | 2/1999 | Gillman et al. | |
| 6,483,912 B1 * | 11/2002 | Kalmanek et al. | 379/219 |
| 2005/0286475 A1 * | 12/2005 | Ahmavaara | 370/335 |
| 2006/0029089 A1 * | 2/2006 | Zellner et al. | 370/412 |

FOREIGN PATENT DOCUMENTS

| | | |
|---|---|---|
| EP | 0 812 089 A2 | 12/1997 |
| WO | WO 00/11850 | 3/2000 |

OTHER PUBLICATIONS

WO 00/11850.*

* cited by examiner

*Primary Examiner*—Hassan Kizou
*Assistant Examiner*—Jay P. Patel
(74) *Attorney, Agent, or Firm*—Sughrue Mion, PLLC

(57) ABSTRACT

The present invention relates to a method of setting up a call matching a predetermined set of requested services and/or characteristics over a network, optionally a network that is composite and multi-component. The method is characterized in that it consists in subdividing said network into a plurality of domains, with a negotiator unit being associated with each domain, in sending to at least one negotiator unit a call setup request together with a set of parameters defining the services and/or characteristics associated with the call to be set up, and, where appropriate, in setting up the call after determining the appropriate available resources in the various domains concerned and selecting resources providing the best possible match with said set of services and/or characteristics.

13 Claims, 1 Drawing Sheet

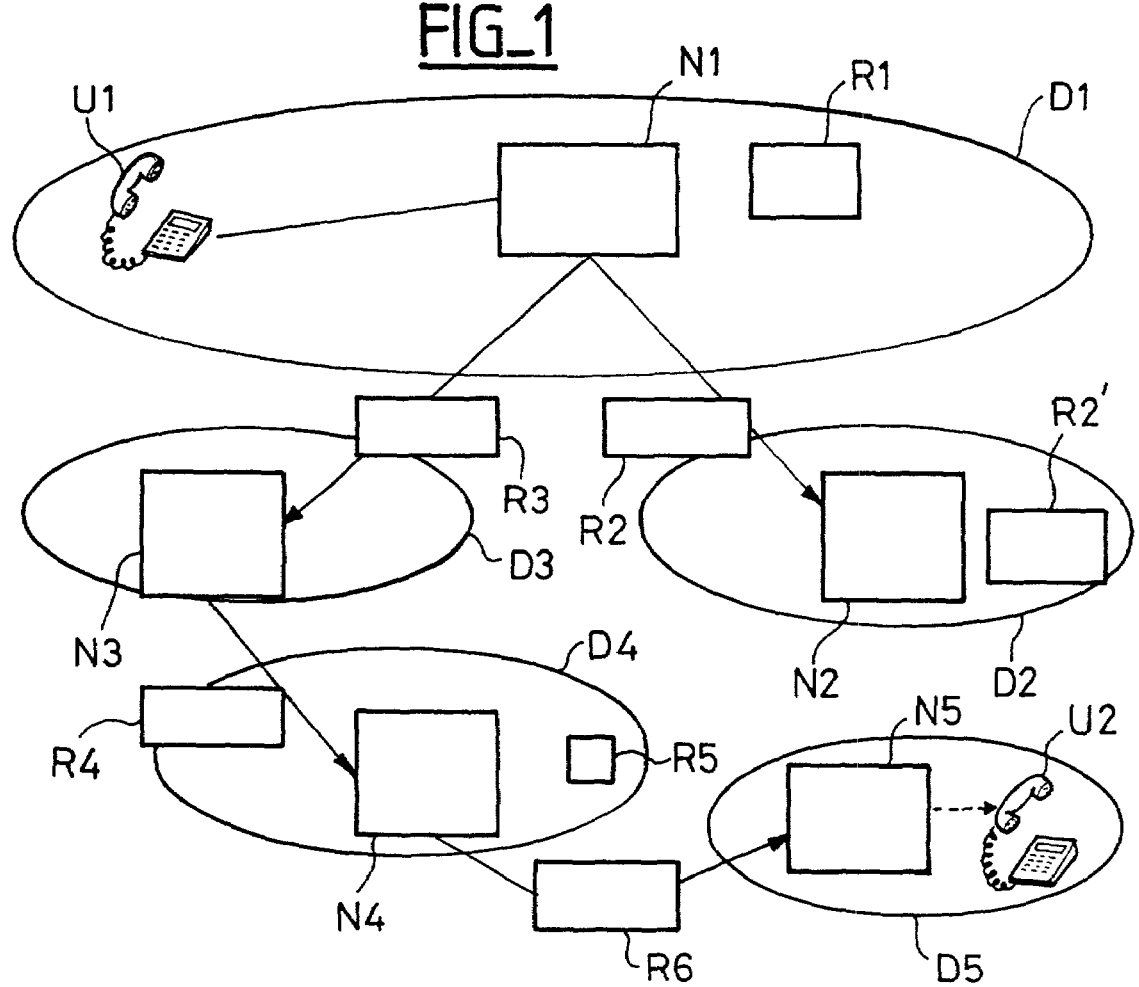
FIG_1
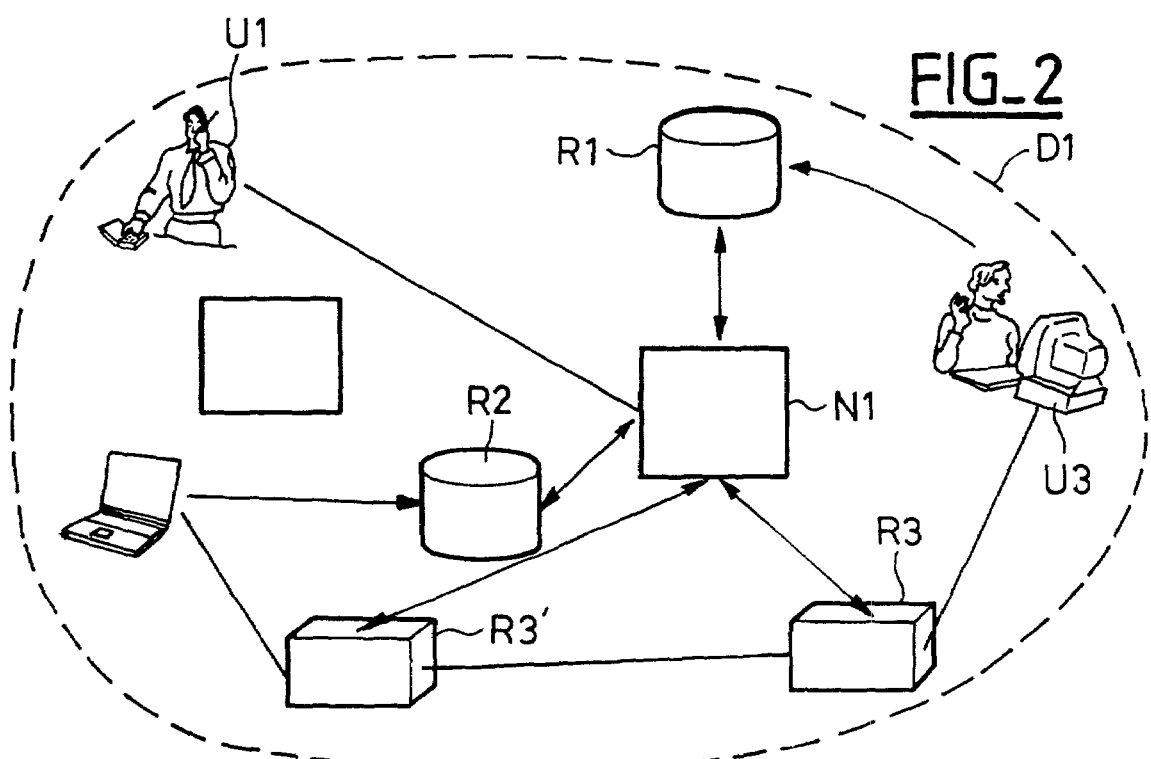
FIG_2

METHOD OF SETTING UP A CALL WITH A PREDETERMINED SET OF REQUIRED SERVICE AND/OR CHARACTERISTICS, AND A CORRESPONDING NETWORK

BACKGROUND OF THE INVENTION

1. Field of the Invention

The present invention relates to the field of telecommunications, and more particularly to sophisticated calls associated with the supply of services, and it provides a method of setting up a call with predefined sources and/or characteristics, and it also provides a network for implementing the method.

2. Description of the Related Art

The object of the present invention is to provide a user with calls presenting properties that are optimized as a function of available resources and of the desires or preferences of the user concerned.

Solutions already exist for setting up a call involving dynamic adaptation of some of its properties. This applies in particular with protocols known under the names H323 and SIP which include the description (H245, SDP) of the transmission medium required so as to enable the parties concerned to give their agreement.

Other known solutions make it possible to reach an agreement concerning certain properties of the transport layer of the communications link, such as quality of service or of transmission, for example.

Those existing solutions propose involving the various parties in choosing a single property of the call. As a result, in known solutions, the properties of a call are essentially conditioned by the resources available, and they are allocated in a manner that is rigid and without negotiation.

Consequently, there exists a need for a solution enabling a call to be adapted to multiple requests and to satisfy desires that are complex in terms of services, so as to provide the best possible satisfaction for the preferences expressed by users in a manner that is flexible and fast.

SUMMARY OF THE INVENTION

To satisfy this need, the present invention provides a method of setting up a call matching a predetermined set of requested services and/or characteristics over a network which may optionally be a composite and multi-component network, the method being characterized in that it consists in subdividing said network into a plurality of domains, with a negotiator unit being associated with each domain; in sending to at least one negotiator unit a request for setting up a call together with a set of parameters defining the services and/or characteristics associated with the call to be set up; and, where appropriate, in setting up said call after determining appropriate available resources in the various domains concerned and selecting those resources that provide the best possible match with said set of services and/or characteristics.

The invention also provides a composite communications network enabling a call to be set up matching a predefined set of services and/or characteristics required by the initiator of the call setup request, the network being characterized in that said composite network is made up of a plurality of domains each of which is associated with a corresponding negotiator unit, the negotiator unit being capable of communicating firstly with the various communications and service resources forming part of or connected to the domain of the unit, and secondly with the negotiator units of the other domains making up said composite network, said domains being interconnected via appropriate interfaces.

The present invention is based on the idea of proposing a method of setting up communication and a composite cellular network architecture that allow for negotiation of all of the resources involved in a call, while taking account both of the availability of said resources and of the desires or preferences of the user.

BRIEF DESCRIPTION OF THE DRAWINGS

The invention will be better understood on reading the following description which relates to a preferred embodiment given by way of non-limiting example and explained with reference to the accompanying diagrammatic drawing, in which:

FIG. 1 is a block diagram showing a call being set up that involves the resources of a plurality of domains forming portions of a composite network in accordance with the invention; and FIG. 2 is a block diagram showing a call being set up within a given domain with a change in call terminal.

DETAILED DESCRIPTION OF THE EXEMPLARY EMBODIMENTS

The present invention relates to a method of setting up a call matching a predetermined set of required services and/or characteristics by means of a network which may optionally be composite or multi-component.

In accordance with the invention, said network is subdivided into a plurality of domains D1 to DM, each of which is associated with a negotiator unit Ni, and the procedure whereby a call is set up consists initially in sending a call request to at least one negotiator unit Ni together with a set of parameters defining the services and/or characteristics associated with the call that is to be set up, and, where appropriate, in setting up said call after determining the appropriate available resources Ri in the various domains Di concerned and selecting those resources Ri that provide the best possible match with said set of services and/or characteristics.

As shown by way of illustrative example in FIGS. 1 and 2 of the accompanying drawing, each negotiator unit Ni is in communication firstly with the various resources Ri and the various service suppliers in the domain Di under consideration which are connected directly or indirectly to said network or which form parts thereof, and secondly with negotiator units N1 to Ni−1 and Ni+1 to NM of other domains D1 to Di−1 and Di+1 to DM, each negotiator unit Ni, on reaching agreement, evaluating, selecting, and reserving the available service providers and resources Ri in the domain Di which is associated therewith and serving to contribute optimally to setting up the intended call.

In a preferred implementation of the invention, the method of setting up a call consists, more precisely:

in transmitting said set of required services and/or characteristics to the negotiator unit Ni of each domain Di situated along the or one of the possible transmission paths for the call that is to be set up, or having at least one resource Ri that might be involved in said call;

in determining by means of said negotiator units Ni and in each of the above-specified domains, those available resources Ri which could contribute to setting up and implementing said call in full or partial compliance with the set of required services and/or characteristics;

in collecting and evaluating the information supplied by the negotiator units NI that have been involved; and in setting up the call as a function of the results of said evaluation and after reserving appropriate resources Ri in the domains Di concerned.

The set of services and/or characteristics required for the call is set by the user U1 who initiates the call, and the request to set up the call and the other requests associated therewith are sent to the negotiator unit Ni of the domain Di in which the user issued the call request and the associated requests, which unit analyzes them and then forwards them to the negotiator units Ni that might become involved.

The call requests of user U1 can be transmitted to the negotiator unit Ni either directly or via the transmission agent of said user.

The negotiator unit Ni addressed by the user U1 is in charge of the negotiation and the reservation of resources Ri necessary for setting up the call with the requested user U2 together with the required properties, in particular the communications medium and the nature and the quality of the call.

Said negotiator unit Ni attempts to satisfy the user's request in the first place by using only resources of the domain Di which is associated therewith.

In the absence of adequate resources within the domain Di that is allocated therewith, the negotiator unit Ni seized by the user will apply to the units Ni of other domains Di.

As examples, the resources Ri available in the various domains Di can be selected from the group formed by transmission network resources (for conveying data between the parties that are connected together), computation and data processing resources, connection resources, communications protocol resources, resources for playing back data and information, database resources or analog information storage resources, interface resources, and other resources Ri depending on each of the negotiator units Ni under consideration.

The computation and data processing resources comprise in particular resources that are used more specifically in communications, i.e. controlling calls, translating standards or protocols, encoding, decoding, or transcoding.

The connection and playback resources can comprise the various man/machine communication interfaces, with the formulation of a request to set up a call optionally being issued by a first interface, while the call is subsequently set up via a second interface that is different from the first and that is identified in the context of the initial request.

The data resources can comprise general or specialized information databases, address databases or databases for finding addresses or the like, where availability and price can be negotiated with the corresponding service provider.

The protocol resources to be used comprise, in particular, encoding as a function of the transmission medium and also the signalling and control protocols which can be defined between the various domains and systems involved in the call.

The characteristics of calls to be set up can be selected from the group constituted by the destination(s) U2, the nature and the quality of the call, the duration of the call, the time at which the call is set up if the call is to be deferred, maximum cost per unit time, or the like.

To facilitate and accelerate negotiations, and also to make it easier for the negotiator units Ni to reach compromises that provide the best possible satisfaction for the desires of a user, provision can be made to weight the various parameters making up the set of required services and/or characteristics in terms of importance or preference.

The negotiator unit Ni designated by the user Ui for setting up the call will normally be authorized to reserve the means and services required for providing the best possible response to the initial request and to select the solution which comes the closest to said request. For this purpose, said negotiator units Ni include means for providing assistance in decision-making, or the like.

While negotiations are taking place for the purpose of setting up a call, the initiating negotiator unit can be applied to to analyze and, where appropriate validate, multiple proposals made by service providers and negotiator units in other domains. Where appropriate, said validation can also be the responsibility of the agent acting on behalf of the user issuing the call request.

In a variant, when it is not possible to satisfy the services and/or characteristics requested by the user U1 who issued the request to set up a call in a manner that provides good satisfaction, provision can also be made for the negotiator unit Ni of the domain in which or via which said user U1 is connected to the network to submit to said user for selection and agreement, one or more call setup possibilities that satisfy approximately the set of services and/or characteristics as initially requested, and this can optionally take place before reserving the resources Ri concerned or before confirming such reservation with the negotiator units Ni, resources Ri, or service providers concerned.

Once negotiations have been completed, the call can be set up on the basis of the resources and the properties for which the various parties have given their agreement.

The present invention also provides a composite communications network enabling a call to be set up in compliance with a predefined set of services and/or characteristics required by a user U1 or the issuer of the request to set up a call, characterized in that said composite network is made up of a plurality of domains D1 to DM each of which is associated with a corresponding negotiator unit Ni, which unit can communicate firstly with the various communications resources Ri and services forming part of or connected to the domain Di of the unit Ni, and secondly with the negotiator units Ni to Ni−1 and Ni+1 to NM of the other domains D1 to Di−1 and Di +1 to DM forming said composite network, said domains Di being interconnected via appropriate interfaces.

A user U1 can be put into communication with one or more other users U2, U3 and/or with one or more service providers.

In an advantageous embodiment of the invention, each domain Di constitutes a structurally and/or logically unitary entity, for example such as a homogeneous network and the service providers connected thereto, with the associated negotiator unit Ni being formed by, or forming part of, the server, or a similar managing computer unit that controls or drives said entity.

Preferably, said composite network is constituted by the Internet and implements the above-described method of setting up a call on any request from a user U1 in any of its component domains Di in order to put that user into communication with the desired destination(s) U2 and/or in order to supply the requested service(s).

The invention also includes an optionally mobile communications terminal forming a part of the above-specified network and adapted to implement the above-described method.

The invention is described in greater detail below with reference to two practical variant applications as shown in FIGS. 1 and 2 of the accompanying drawing.

FIG. 1 is a diagram showing negotiations for resources and setting up a call when the user U1 seeks to set up a call with the user U2.

Initially, the user U1 sends a call setup request to the negotiator unit N1 of the user's own domain D1, together with the desired parameters.

The negotiator unit N1 attempts to satisfy the user's request and makes contact with a data resource R1 that is to be found in the same domain and with which it makes a contract.

The computation, presentation, and protocol resources do not constitute the subject matter of negotiation since they are fixed by the user and they are satisfied. In the present case, the user seeks to use as a communications interface the appliance with which the call is initiated, and the call needs to implement the protocol supported by the appliance and the computation resources supplied thereby.

Since the negotiator unit N1 cannot satisfy the requests concerning the transmission and network resources (the called party U2 being situated in a different domain), and is also incapable of satisfying the requests concerning service resources, it forwards the requests of the user concerning these points to the other negotiator units N1 which are in contact therewith.

The negotiator unit N2 has access to a service provider R2' that is capable of providing the requested service, so the negotiator unit N1 makes a reservation for R2' via N2.

Concerning network resources, appropriate reservation is implemented via negotiator units N3, N4, and N5 each of which makes use of the network resources of their respective domains, and also optionally of the appropriate interface resources R4 and R6.

In the procedure shown, the negotiator unit N1 has not reserved service resources R5 offered by negotiator unit N4 since these resources are equivalent to service resources R2', and the offer forwarded by negotiator unit N2 is judged to be more favorable (also reserving interface resources R2).

Once agreement has been reached between the various parties, the call is set up using the resources that have been reserved.

FIG. 2 in the accompanying drawing shows a call being set up when user U1 calls user U3 situated in the same domain D1 as U1, together with various requested resources.

The call setup request also comprises preferences specified by user U1 and is sent to the negotiator unit N1.

Initially, said negotiator unit consults a directory R1 to determine how user U3 can be contacted. This directory is updated whenever a connection is made with the user U3 and is therefore capable of providing the necessary data for contacting U3.

Thereafter, the negotiator unit can negotiate the transmission resources R3 and R3' necessary for setting up the desired call.

Simultaneously, the negotiator unit can inform the supplier of connection, interface, and playback resources R2 that the user U3 is using a multimedia computer and, on the basis of this information, a search and a negotiation stage are begun for locating and making a connection to the portable computer of user U1.

In compliance with the preferences expressed by the user U1 together with the negotiation strategy and rules set by that user, the call is set up between the computers of the two users U1 and U3.

The invention thus provides both a method of setting up a call and a network architecture that make it possible to achieve the best possible match between the properties of the call and the preferences issued by the user. The user is no longer obliged to make use solely of certain fixed resources allocated to the user, since all of the parameters of the call are fixed dynamically in the context of negotiation and optimum matching between the user requests and the available resources.

The negotiator units and the service and resource providers are preferably constituted by distributed systems that can be based on the so-called CORBA structure. The requests, offers, or proposals interchanged between the various parties involved (users, negotiator units, resources, service providers, . . . ) can advantageously be implemented using the XML language to facilitate their description and their automatic interpretation by computer units.

Naturally, the invention is not limited to the embodiment described and shown in the accompanying drawing. Modifications remain possible, in particular concerning how the various elements are constituted and involving the substitution of technical equivalents, without thereby going beyond the ambit of the protection of the invention.

The invention claimed is:

1. A method of setting up a call matching a predetermined set of requested services and/or characteristics over a network the method comprising:

subdividing said network into a plurality of domains with a negotiator unit being associated with each domain;

sending to at least one negotiator unit a request for setting up a call together with a set of parameters defining the services and/or characteristics associated with the call to be set up;

said at least one negotiator unit contacting resources of its domain and contacting negotiator units of other domains requesting available resources in said other domains;

determining and selecting resources, from the resources of said at least one negotiator unit domain and the resources provided by the negotiator units of said other domains, that provide best possible match with said set of services and/or characteristics; and setting up said call using said determined and selected resources.

2. A method according to claim 1, wherein each negotiator unit is in communication with:

the various resources of a respective domain and service providers in the respective domain under consideration, whether connected directly or indirectly to said network or forming portions thereof, and the negotiator units of the other domains, where each negotiator unit valuates, selects, and reserves, after reaching an agreement, the resources and/or services available in the respective domain contributes to setting up the intended call in an optimal manner.

3. A method according to claim 1, wherein:

said set of requested services and/or characteristics are sent to the negotiator unit of each domain situated along any possible transmission path for the call to be set up, or having at least one resource which might be involved in said call, said negotiator units in each of the above-specified domains determine which resources are available and suitable for contributing to setting up and implementing said call in full or partial compliance with the requested set of services and/or characteristics, the information supplied by the addressed negotiator units is collected and evaluated; and the call is set up as a function of the results of said evaluation and after reserving suitable resources in the domains concerned.

4. A method according to claim 1, wherein:
the set of services and/or characteristics requested for the call is set by the user that initiates the call,
the call setup request and the requests associated therewith are sent to the negotiator unit of the domain in which the user issues the call request and the associated requests, and
the negotiator unit analyzes the call request and the associated requests and forwards the call request and the associated requests to the negotiator units that might become involved in the set up of the call.

5. A method according to claim 1, wherein the resources available in the other domains are selected from a group formed by: transmission network resources; computation and data processing resource; connection resources; communications protocol resources; data and information playback resources; database resources or analogous information storage resources; interfacing resources; and other resources depending on each of the negotiator units under consideration.

6. A method according to claim 1, wherein the characteristics of the call to be set up are selected from a group formed by a destination, nature and quality of the call, duration of the call, time at which the call is to be set up if it is to be set in a deferred time, and maximum cost per unit time.

7. A method according to claim 1, further comprising weighting various parameters that make up the set of requested services and/or characteristics in terms of at least one of importance and preference.

8. A method according to claim 1, wherein, if the negotiator unit of the negotiator unit domain, in which or via which a user that issued the call setup request is connected to the network, is not in a position to adequately satisfy the services and/or characteristics requested by said user, then the negotiator unit submits to said user, for selection and agreement, one or more call setup options approximately satisfying the set of services and/or characteristics as initially requested, with this optionally taking place prior to reserving the resources concerned or prior to confirming such reservation with the negotiator units of the resources or services concerned.

9. A composite communications network enabling a call to be set up matching a predefined set of services and/or characteristics required by the initiator of the call setup request, the network comprising:
a plurality of domains,
wherein each of said plurality of domains is associated with a corresponding negotiator unit,
wherein each of the negotiator units communicates with:
various communications and service resources forming part of or connected to a domain of the respective negotiator unit, and
negotiator units of other domains,
wherein said domains are interconnected via appropriate interfaces.

10. A network according to claim 9, wherein each domain constitutes a structurally and/or logically unitary entity, and wherein associated negotiator unit being formed by or forming part of a server, or a similar managing computer unit, that controls or drives said unitary entity.

11. A network according to claim 9, further comprising an Internet, and wherein the network implements the method comprising:
sending to at least one negotiator unit a request for setting up a call together with a set of parameters defining the services and/or characteristics associated with the call to be set up;
said at least one negotiator unit contacting resources its domain and negotiator units of other domains requesting available resources in said other domains;
determining and selecting resources, from the resources of said at least one negotiator unit domain and the resources provided by the negotiator units of said other domains, that provide best possible match with said set of services and/or characteristics; and
setting up said call using said determined and selected resources.

12. A mobile terminal forming portion of the network according to claim 9.

13. The network according to claim 10, wherein said unitary entity is a homogenous network having service providers connected thereto.

* * * * *